Sept. 19, 1961        C. J. CISLO        3,000,624
AIR SPRING ASSEMBLY AND CONTROL DEVICE THEREFOR
Filed Nov. 10, 1958
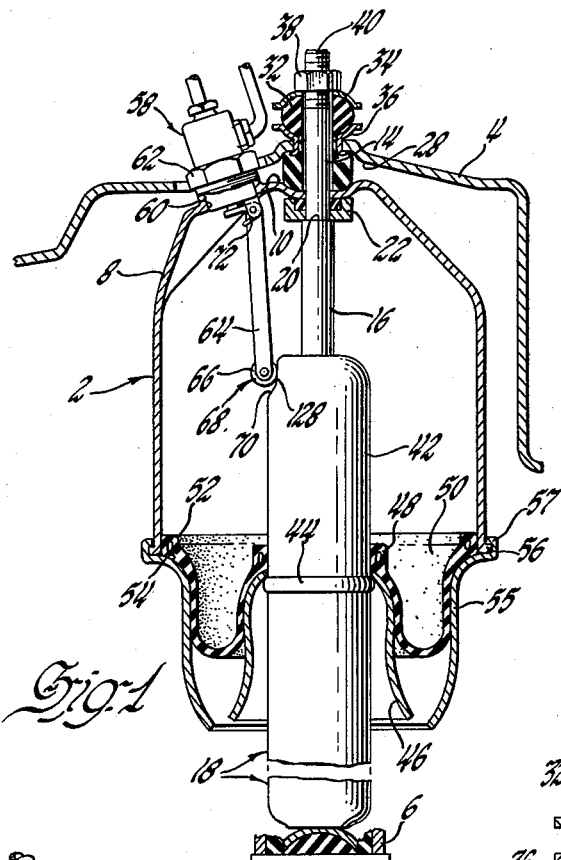
INVENTOR.
Casimer J. Cislo
BY
W. H. Wagner
ATTORNEY United States Patent Office 3,000,624
Patented Sept. 19, 1961

3,000,624
AIR SPRING ASSEMBLY AND CONTROL
DEVICE THEREFOR
Casimer J. Cislo, Detroit, Mich., assignor to General Motors Corporation, Detroit, Mich., a corporation of Delaware
Filed Nov. 10, 1958, Ser. No. 772,922
2 Claims. (Cl. 267—65)

This invention relates to vehicle air spring assemblies and more particularly to control apparatus associated therewith.

An object of the invention is to provide an improved air spring assembly.

Another object is to provide an air spring assembly incorporating improved and simplified apparatus for controlling flow of air into and out of the spring.

A further object is to provide in an air spring assembly, a leveling valve which is simple in construction, low in cost and efficient in operation.

Still another object is to provide a simplified air spring leveling valve in which both intake and exhaust air movement is controlled by a single flexible closure element.

Yet another object is to provide a leveling valve having a double acting closure.

A still further object is to provide a device of the stated character in which the intake and exhaust passages are arranged concentrically, and opening and closing thereof is effected by a single axially displaceable flexible element.

These and other objects, advantages, and features of the invention will become more fully apparent as reference is had to the accompanying specification and drawings wherein:

FIG. 1 is a fragmentary view, partly in section, illustrating an air spring assembly embodying the invention;

FIG. 1a is an enlarged fragmentary view of a portion of FIG. 1; and

FIG. 2 is an enlarged fragmentary view, partly in section, illustrating the details of construction and relative arrangement of parts of the leveling valve construction.

Referring now to the drawings and particularly FIG. 1, reference numeral 2 designates generally an air spring assembly which is disposed between a portion 4 of the sprung mass of a vehicle, not shown, and an intermediate portion 6 associated with the wheel suspension lower control arm, also not shown. It will be understood that spring assembly 2 may be utilized in any desired location in conventional vehicle suspension and that the particular relationship shown is for purposes of illustration only.

In accordance with the general features of the invention, assembly 2 includes an inverted rigid metal container or dome 8, the upper wall 10 of which is provided with a central aperture 12 through which extends the reduced portion 14 of a piston rod 16. Piston rod 16 forms a part of hydraulic shock absorber assembly 18 which is disposed concentrically in dome 8. A shoulder 20 formed at the lower end of reduced portion 14 provides an abutment for a ring member 22 which carries an annular resilient washer 24 adapted for abutting engagement with the portion of upper wall 10 surrounding aperture 12. Reduced portion 14 of piston rod 16 extends upwardly beyond aperture 12 and is surrounded by an annular resilient member 26 disposed between the upper wall 10 of dome 8 and the lower wall 28 of portion 4 of the vehicle sprung mass. Reduced portion 14 continues upwardly through an aperture 30 in portion 4 and is surrounded by a second annular resilient member 32 which is compressed between two oppositely dished washers 34 and 36 by a nut 38 threadably assembled on the threaded end 40 of portion 14. When in assembled relation, dome 8 is maintained in substantially concentric relation with piston rod 16 regardless of the change in angular position assumed by the shock absorber during wheel deflection.

Shock absorber 18 is of the type including a completely enclosing casing 42 having a circumferential rib 44 formed vertically intermediate thereon which acts as a shoulder abutment for a generally bell-shaped air spring piston 46. Piston 46, in turn, cooperates with shock absorber 18 to form a shoulder which engages an inner enlarged bead 48 of a flexible diaphragm 50, the outer enlarged bead 52 of which abuttingly engages an annular shoulder 54 formed by a diaphragm retainer 55. Retainer 55 is arranged in concentric relation with piston 46 and is formed with a circumferential channel portion 57 which is clinched over the radial 56 at the lower extremity of dome 8.

In the present invention, flow of air into and out of the interior of spring 2 is controlled by a leveling valve assembly 58 which extends through an opening 60 in the upper wall of dome 8 and is secured therein by a threaded collar 62. Assembly 58 includes a depending operating lever 64 having a roller 66 mounted on the lower end thereof adapted for rolling engagement with a cam surface 68 preformed at the upper left hand wall of shock absorber casing 42. As will be evident from FIG. 1, vertical deflection of the air spring piston 46 will occur simultaneously with corresponding deflection of shock absorber casing 42. Accordingly, upward deflection of piston 46 from the normal or design height position shown will cause the roller 66 to engage the inclined ramp portion 70 of cam surface 68 thereby urging the lever 64 toward the left while downward displacement of casing 42 will permit roller 66 to move toward the right under the influence of spring 72.

Referring now to FIG. 2, it will be seen that assembly 58 includes a casing 74 having a relatively large diameter cylindrical cavity 76 formed therein. At the base of cavity 76 is a frusto-conical seat 78 through which extends a relatively small diameter aperture 80 arranged coaxially with cylindrical cavity 76. At its upper end, cavity 76 is formed with a counterbore 82 providing a shoulder 84. Disposed in cavity 76 is a one-piece flexible tubular element 86 having a flange 88 at the upper end thereof engaging shoulder 84. Element 86 is formed with a relatively thin intermediate wall section 90 and terminates in a thickened lower wall section 92 provided by reducing the inner diameter of the tubular member to form a small diameter passage 94. Externally, the lower end of element 86 is formed with a semi-spherical nose portion 96 which normally resiliently engages frusto-conical seat 78 of cavity 76. To secure element 86 in the position shown, a fitting 97 having a flange 98 is slidably disposed in counterbore 82 and is urged into compressive engagement with flange 88 by means of a radial expansion type snap ring 100 which engages a cooperating groove 102 in casing 74. Fitting 97 includes a threaded portion 104 adapted for connection with an air exhaust line 106 by means of threaded connector 108. Air intake line 110, in turn, is connected in communicating relation with the portion of cavity 76 surrounding element 86 by means of a double connector assembly comprised of threaded fittings 112 and 114.

In order to secure assembly 58 in fluid tight assembled relation with dome 8, casing 74 includes a radial flange 116 which is adapted for abutting engagement with the end of threaded neck portion 118 surrounding opening 60. Immediately below flange 116 casing 74 is formed with a radial groove 119 in which is disposed an O-ring seal 120. Threaded collar 62 acts to securely clamp to casing 74 relative to neck portion 118, while O-ring 120 assures freedom from leakage.

In order to utilize the alternate rocking movement of lever 64 to provide for intake and exhaust of air in accordance with the present invention, the upper end of the lever is pivotally secured at 122 on casing 74 and is provided with a short arm portion 124 having an upwardly directed bulged portion 126 which normally extends into aperture 80. It will be evident that leftward movement of lever 64 will cause bulged portion 126 to move upwardly with respect to aperture 80, while rightward movement of the lever will cause portion 126 to move downwardly relative to aperture 80.

In order that the invention may be more fully understood, a description of the mode of operation follows. When dome 8 and piston 46 are in the normally displaced relation shown in FIG. 1, roller 66 on lever 64 engages the flat vertical wall portion 128 of cam 68 and maintains the lever in the angular position shown in FIG. 1. With the lever 64 in the position shown, projection 126 on portion 124 abuttingly engages the nose 96 of element 86 and closes small bore passage 94. Simultaneously, the outer surface of nose portion 96 resiliently engages conical seat 78 of cavity 76. Under these circumstances, communication between the interior of spring 2 and either exhaust line 106 or intake line 110 is prevented. However, upon upward deflection of the piston 46, lever 64 is caused to move to the left by cam 68 which results in upward movement of portion 126 sufficient to deform the thin wall section 90 of element 86 and cause the nose portion 96 to move away from conical seat 78. This immediately provides communication between the spring and the portion of cavity 76 surrounding flexible element 86 and allows movement of air from intake line 110 into the spring. Such air movement continues until the predetermined displacement has been restored, at which time portion 126 moves downwardly and allows nose portion 96 of flexible element 86 to re-engage seat 78 and interrupt further intake flow. Conversely, when the displacement between dome 8 and piston 46 exceeds that shown in FIG. 1, lever 64 moves toward the right and causes portion 126 to move downwardly sufficient to open passage 94 in flexible element 86 for communication with the interior of the spring, thereby allowing air in the spring to flow through passage 94 into exhaust line 106 until the spring displacement is restored.

From the foregoing it will be seen that a novel and improved structure has been devised. The parts required are not only extremely few in number but are also singularly uncomplicated in configuration. In addition, assembly and disassembly require a minimum of skill and equipment. Still another advantage resides in the fact that owing to the resilient character of element 86, the operation of the mechanism is characterized by a certain degree of "dwell" in which neither passage is open, thereby preventing air movement until a significant change in spring displacement occurs.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In an air spring assembly of the type including a piston and cylinder connected by a flexible diaphragm, a hydraulic shock absorber arranged concentrically with said spring and having a portion thereof extending into said cylinder, a leveling valve mechanism mounted externally on a wall of said cylinder, an operating lever for said mechanism extending through said wall into said cylinder, means forming a cam surface on a vertical wall of said shock absorber, and a roller on the free end of said lever engaging said cam surface.

2. In an air spring assembly of the type including a piston and cylinder connected by a flexible diaphragm, a hydraulic shock absorber arranged concentrically with said spring and having a portion thereof extending into said cylinder, means for maintaining said cylinder and shock absorber in axial alignment throughout the range of deflection thereof, a leveling valve mechanism mounted externally on a wall of said cylinder, an operating lever for said mechanism extending through said wall into said cylinder, means forming a cam surface on a vertical wall of said shock absorber, and a roller on the free end of said lever engaging said cam surface.

References Cited in the file of this patent

UNITED STATES PATENTS

| | | |
|---|---|---|
| 2,147,990 | Richter | Feb. 21, 1939 |
| 2,208,537 | Brown | July 16, 1940 |
| 2,246,667 | Colman | June 24, 1941 |
| 2,733,931 | Reid et al. | Feb. 7, 1956 |
| 2,844,385 | Pribonic | July 22, 1958 |
| 2,893,104 | Hancock | July 7, 1959 |

FOREIGN PATENTS

| | | |
|---|---|---|
| 893,857 | France | Feb. 28, 1944 |